A. TISMAN.
AUTOMOBILE BUMPER.
APPLICATION FILED NOV. 30, 1917.
1,292,156.
Patented Jan. 21, 1919.
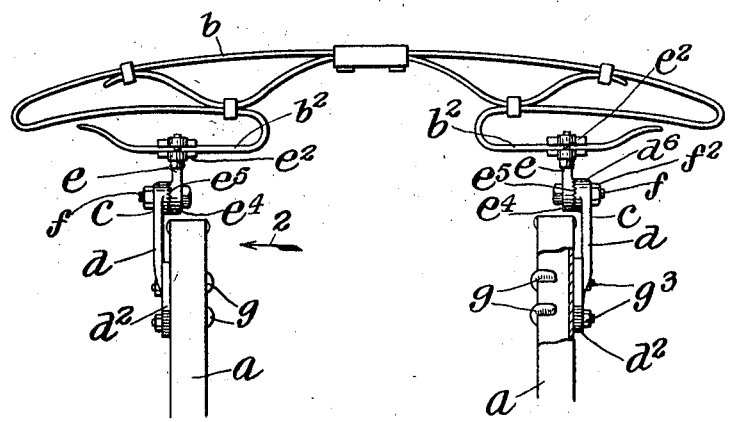
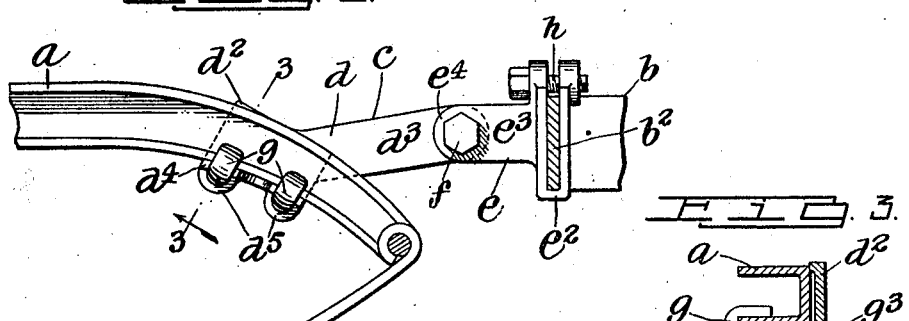
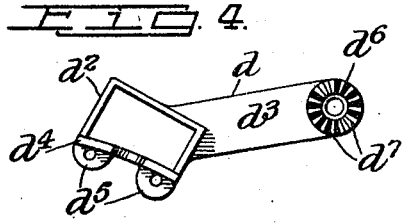
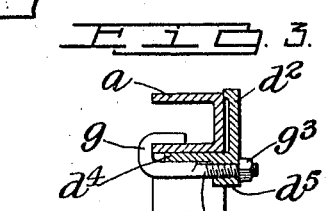
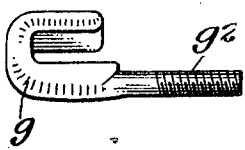
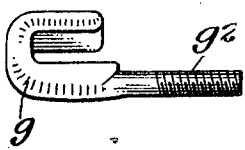
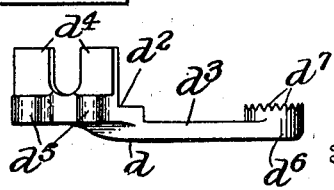
Inventor
Abraham Tisman
By his Attorney's
Edgar Tate Co.

UNITED STATES PATENT OFFICE.

ABRAHAM TISMAN, OF NEW YORK, N. Y.

AUTOMOBILE-BUMPER.

1,292,156.   Specification of Letters Patent.   Patented Jan. 21, 1919.

Application filed November 30, 1917. Serial No. 204,548.

*To all whom it may concern:*

Be it known that I, ABRAHAM TISMAN, a citizen of Russia, and residing at New York, in the county of New York and State of New York, have invented certain new and useful Improvements in Automobile-Bumpers, of which the following is a specification, such as will enable those skilled in the art to which it appertains to make and use the same.

This invention relates to bumpers or buffers for power driven vehicles, and to devices of this class such as are usually connected with the forwardly directed side extensions of the chassis, and the object thereof is to provide improved attaching devices for connecting spring bumpers or buffers with the chassis, each of which consists of two parts having no spring action and no spring connections, and with one of which the spring bumper or buffer is detachably connected and the other of which is connected with the said side extensions of the chassis, and with this and other objects in view the invention consists in devices of the class specified, constructed and operating as hereinafter described and claimed.

The invention is fully disclosed in the following specification, of which the accompanying drawing forms a part, in which the separate parts of my improvement are designated by suitable reference characters in each of the views, and in which:

Figure 1 is a plan view of the forwardly directed side extensions of the chassis of an automobile and showing a spring bumper device connected with the said extensions by my improved attaching devices;

Fig. 2 a view looking in the direction of the arrow 2 of Fig. 1;

Fig. 3 a section on the line 3—3 of Fig. 2;

Fig. 4 an inside view of one part of my improved attaching device or devices;

Fig. 5 a bottom plan view thereof; and,

Fig. 6 a side view of a clamp hook which I employ.

In the drawing forming part of this specification, I have shown at $a$ forwardly directed side extensions of the chassis of an automobile and with which bumpers or buffers of the class under consideration are usually connected, and at $b$ I have shown a spring bumper or buffer which may be of any desired form or construction, but which is provided with parts $b^2$ by means of which it is connected with the attaching devices, as hereinafter described.

Each of my improved attaching devices $c$ consists of two main parts $d$ and $e$ and two thereof are employed. The parts $d$ comprise head portions $d^2$ and arm portions $d^3$, and the head portions $d^2$ are L-shaped in cross section and comprise back plates and bottom plates $d^4$, and beneath the back plates are downwardly directed ears $d^5$, and the free end portions of the arms $d^3$ are provided with circular heads $d^6$ having lock teeth $d^7$.

The parts $e$ of the attaching devices comprise yoke-shaped clamp members $e^2$ one side of each of which is provided with a short arm $e^3$ having a head $e^4$ provided with lock teeth $e^5$ which coöperate with the lock teeth $d^7$, and the separate parts $d$ and $e$ of the attaching devices are connected by bolts $f$ passed through the heads $d^6$ and $e^4$ and provided with nuts $f^2$, and by means of this construction the parts $e$ of the fastening devices $c$ may be adjusted vertically, as will be readily understood.

The parts $a$ of the chassis are constructed of channel iron or are U-shaped in cross section and are so placed that the channel therein opens inwardly. In connecting the parts $d$ of the attaching devices therewith, the heads $d^2$ of the said parts are placed, as shown, with the arms $d^3$ on the outer sides of said extensions and the bottom parts $d^4$ of the heads $d^2$ on the bottom thereof. I also provide clamp hooks $g$ having shanks $g^2$, which hooks $g$ are placed so as to engage the bottom flanges of the extensions $a$ of the chassis and also the bottoms $d^4$ of the heads $d^2$, as clearly shown in Figs. 2 and 3, while the shanks $g^2$ of said hooks $g$ are passed through the ears $d^5$ of the heads $d^2$, and nuts $g^3$ are employed in connection therewith. By means of this construction the arms $d^3$ of the parts $c$ of the attaching devices are securely bound to the outer sides of the forwardly directed extensions $a$ of the chassis. In connecting the spring bumper or buffer $b$ with the parts $e$ of said attaching devices, the parts $b^2$ of the bumper or buffer are dropped into the yoke-shaped clamps $e^2$ where they are secured by means of bolts or screws $h$ passed through the tops or head portions of the sides of the yoke-shaped clamps $e^2$.

With this construction the spring bumper or buffer may be vertically adjusted into different positions, as will be readily understood, and the attaching devices c may be quickly and easily connected with the parts whenever necessary, or desirable, or as quickly and easily detached therefrom, and with this improvement, it will be seen that the attaching devices c are connected with the outer sides of the parts a instead of being mounted on and secured to the tops thereof as is customary, and while I have shown and described the parts a with the channels therein opening inwardly, this position of said parts may be reversed and the attaching devices may be connected with the inner sides thereof.

The spring bumper or buffer device b is similar to that shown and described in a prior application for Letters Patent of the United States filed by me August 14, 1917, Serial No. 186,105, and the method of connecting said bumper with the parts e of the attaching devices c and the method of connecting the parts e of the fastening devices with the parts d thereof is similar to that employed in said prior application, the novel feature in this case being the method of, and means for, connecting the parts d of the attaching devices with the side extensions a of the chassis, as herein shown and described.

Having fully described my invention, what I claim as new and desire to secure by Letters Patent, is:—

1. A bracket device for connecting spring buffers with forwardly directed channeled extensions of the chassis of a vehicle, said device consisting of two parts detachably and adjustably connected, one of said parts comprising an integral arm having an L-shaped head adapted to engage the back and bottom of said channeled extensions, said L-shaped heads being provided with downwardly directed lugs having apertures, clamp hooks mounted in said apertures and adapted to engage the bottom of the channeled extensions to secure said part to the same and the other of said parts comprising an arm provided with a yoke-shaped clamp adapted to receive and support a spring buffer device.

2. A bracket device for connecting spring buffers with forwardly directed channeled extensions of the chassis of a vehicle, said device consisting of two parts detachably and adjustably connected, one of said parts comprising an integral arm having an L-shaped head adapted to engage the back and bottom of said channeled extensions, said L-shaped head comprising a back member having a countersunk inner face and a bottom member consisting of two inwardly directed feet and two downwardly directed lugs having apertures, clamp hooks mounted in the apertures in said lugs and adapted to engage the bottom of said channeled extensions to secure said part to the same and the other of said parts being adapted to receive and support a spring buffer device.

In testimony that I claim the foregoing as my invention I have signed my name in presence of the subscribing witnesses this 28th day of November, 1917.

ABRAHAM TISMAN.

Witnesses:
C. E. MULREANY,
H. C. THOMPSON.